United States Patent [19]

Iwata

[11] 4,039,740
[45] Aug. 2, 1977

[54] CRYOGENIC POWER CABLE

[75] Inventor: Zensuke Iwata, Yokohama, Japan

[73] Assignee: The Furukawa Electric Co., Ltd., Tokyo, Japan

[21] Appl. No.: 587,860

[22] Filed: June 18, 1975

[30] Foreign Application Priority Data

| June 19, 1974 | Japan | 49-70035 |
| Nov. 22, 1974 | Japan | 49-134610 |
| Apr. 3, 1975 | Japan | 50-40654 |

[51] Int. Cl.² .......................................... H01B 12/00
[52] U.S. Cl. ............................... 174/15 S; 174/25 R; 174/120 FP
[58] Field of Search ................. 174/15 C, 15 S, 25 R, 174/25 C, 126 S, 121 R, 120 R, 120 FP

[56] References Cited

U.S. PATENT DOCUMENTS

| 3,080,446 | 3/1963 | Volk | 174/25 R |
| 3,459,871 | 8/1969 | Eager, Jr. et al. | 174/25 R |
| 3,509,266 | 4/1970 | Endacott | 174/25 R X |
| 3,509,269 | 4/1970 | Elliott | 174/120 |
| 3,562,401 | 2/1971 | Long | 174/15 S |
| 3,748,372 | 7/1973 | McMahon et al. | 174/25 R |
| 3,749,811 | 7/1973 | Bogner | 174/126 S |
| 3,773,965 | 11/1973 | Reynolds | 174/25 G |
| 3,780,206 | 12/1973 | Reynolds | 174/120 FP X |
| 3,862,353 | 1/1975 | Morton | 174/121 R X |
| 3,885,636 | 5/1975 | Hildebrandt | 174/15 S |
| 3,900,701 | 8/1975 | Bayles | 174/121 A X |

FOREIGN PATENT DOCUMENTS

| 810,315 | 4/1969 | Canada | 174/25 C |
| 1,505,605 | 12/1967 | France | 174/15 S |
| 2,113,597 | 10/1972 | Germany | 174/15 S |
| 1,142,047 | 2/1969 | United Kingdom | 174/25 C |
| 817,616 | 8/1959 | United Kingdom | 174/25 G |

Primary Examiner—Arthur T. Grimley
Attorney, Agent, or Firm—Armstrong, Nikaido & Marmelstein

[57] ABSTRACT

A cryogenic power cable of a cryoresistive type having a conductor which is cooled with a cooling medium to permit large capacity power transmission by reducing thereby the electric resistance and the joule loss of the conductor. The temperature of the cable core is controlled through an ingenious arrangement comprising the conductor which incorporates therein a passage for the cooling medium, an electric insulation layer made of an ordinary electric insulating material and a thermal insulating material layer. The cable not only makes ultra-high voltage transmission of 500 to 1000 KV possible but also is advantageous on account of a simple and economic structure.

13 Claims, 8 Drawing Figures

Breakdown strength vs Temperature (DDB impregnated Kraft paper)

Breakdown strength vs Temperature (DDB impregnated Tyvek)

Breakdown strength vs Temperature
(DDB impregnated polyethylene)

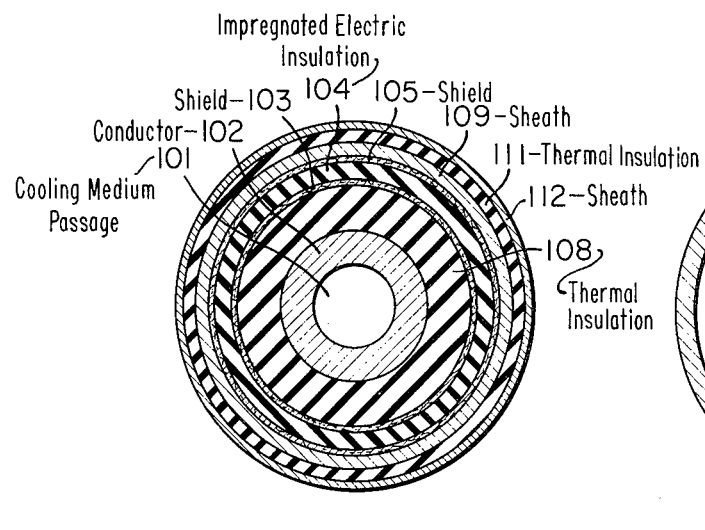
FIG.3
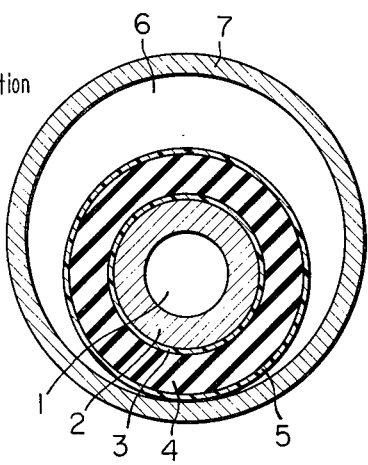
FIG.5
FIG.4
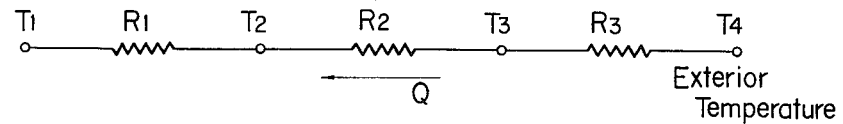
FIG.6
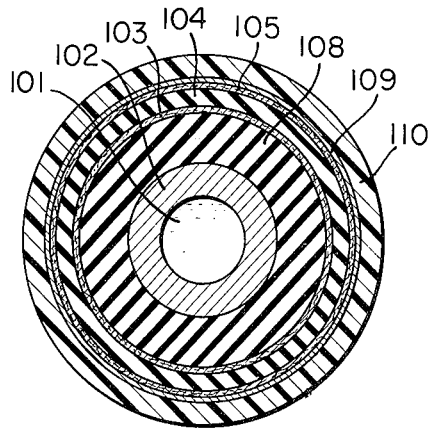

CRYOGENIC POWER CABLE

DETAILED DESCRIPTION OF THE INVENTION

This invention relates to a cryogenic power cable which permits large capacity power transmission with the electric resistance and the joule loss of the conductor of the cable reduced by cooling the conductor with a cryogenic cooling medium and more particularly to a system wherein a layer of a thermal insulating material is provided on the cryogenic conductor before providing an electric insulating arrangement on the conductor so that the ordinary electric insulating materials which have conventionally been used for power cables can be used as they are for the cryogenic conductor. With oil impregnated paper used for an electric insulation layer, for example, the temperature of the layer can be maintained within a range of −40° to −100° C and this provides for designing for high working stress.

At present, cryogenic power cables are being developed in various countries of the world. However, all of such developments have been confined to the methods of effecting electrical insulation under cryogenic temperature. For example, a cooling medium such as liquid nitrogen, helium, etc. is used either directly for electrical insulation or for impregnating a plastic tape therewith. The latter method gives a higher performance in terms of withstand voltage, and is therefore considered more promising than the former. Hence such research and development work is being conducted in the latter method in most cases. The electric insulating paper which is prepared by impregnating plastic tape with a cryogenic cooling medium, for example polyethylene paper impregnated with liquid nitrogen, gives the characteristic which is close to that of the conventional oil impregnated kraft paper. However, as compared with the oil impregnated kraft paper, it is inferior in terms of impulse breakdown strength. It also has many unknown points that require further studies with respect to stability over a long period of time. On the other hand, polyethylene paper impregnated with liquid helium has the breakdown characteristic which is only about a half of that of the oil impregnated insulation material. In view of such, researches are being conducted with importance now attached to studies of various materials under cryogenic conditions.

In the conventional oil-filled cable of ultra-high voltage such as 275 KV and 500 KV using an insulation prepared by impregnating an insulating paper such as kraft paper with an insulating oil, the allowable current is limited as the layer of such an insulator becomes thick and the dielectric loss also increases.

Accordingly, the economic merit of the cable is lost due to such shortcomings. In view of such, efforts have been exerted to obtain an insulation of a smaller dielectric loss and a low dielectric constant. Some attempts have also been made to minimize the dielectric loss and the dielectric constant and to improve the withstand voltage characteristic by using (1) an insulating paper comprising a kraft paper (cellulose paper), a non-woven paper, a synthetic paper, a laminated paper, or a plastic composite paper obtained from a combination of such papers or a composite paper obtained from a combination of a plastic and a cellulose; and (2) a plastic film. However, such attempts have not been successful as yet in terms of the cost, thermal resistance and stability over a long period of time. For improvement in the allowable current of the cable, there are two known methods. In one method, the heat generated in the conductor and the insulator is removed by forced cooling while the thickness of the insulating layer is reduced by high working stress designing so that the thermal resistance can be lessened to facilitate thermal diffusion. In accordance with the other method, the heat generation is lessened by lowering the dielectric constant and the dielectric loss of the insulator and/or electric resistance of conductor.

BRIEF DESCRIPTION OF THE DRAWINGS

FIG. 3 is a sectional view illustrating a low temperature power cable prepared in accordance with this invention.

FIG. 4 illustrates the influent heat quantity entering the cable of this invention.

FIG. 5 is a sectional view illustrating a conventional cryogenic power cable.

FIG. 6 is a sectional view illustrating an another example of a low temperature power cable prepared in accordance with this invention.

Figure 1A:
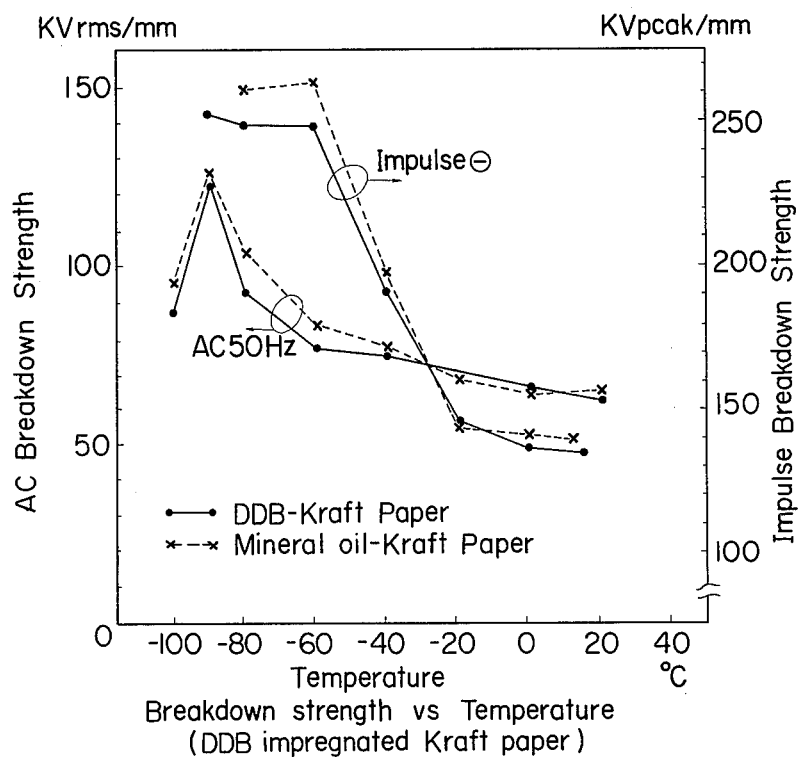
FIGS. 1A, 1B and 1C are graphs illustrating the relation of the temperature to the electric characteristics of an oil impregnated papers which are prepared by impregnating kraft paper, spunbonded polyethylene paper and low density polyethylene paper with dodecyl benzene, except that FIG. 1A includes a paper prepared by impregnating kraft paper with mineral oil instead of dodecyl benzene.

An example of the above stated known methods is illustrated in the accompanying drawing FIG. 5, wherein: A liquid insulation arrangement, for example, an insulation layer 4 of plastic paper impregnated with liquid nitrogen is provided, through a conductor shielding layer 3, on a conductor which is provided with a cooling medium passage 1, for example a liquid nitrogen inlet, with an insulation shielding layer 5 arranged on the outside of the insulation layer to form a core. Between the cable core thus formed and a thermal insulating pipe 7 which has been manufactured beforehand, a cooling medium such as liquid nitrogen is allowed to flow to cool the conductor to a temperature of about −196° C. By this, the electric resistance of the conductor is greatly lowered to decrease the joule loss. In a cable which is prepared in such a manner, however, the insulation layer made of the plastic paper is also cooled down to a great degree. Such cooling then makes the plastic paper brittle and liable to crack. In addition, thermal contraction causes additional strain, which results in gaps between adjacent portions of the plastic paper. Such gaps then make it difficult to attain the insulating purpose for the ultra-high voltage power transmission. Furthermore, when a sudden temperature variation takes place either in the whole or part of the core, the cooling medium contained in the insulation layer tends to gasify thus producing voids which make the electric characteristics of the cable unstable. Besides such shortcomings, the insulation layer which is prepared by winding such a cryogenic-liquid impregnated tape has not been tried in actual applications and there still remain many unknown factors which require clarification through further studies. Such shortcomings of the conventional methods can be eliminated by this invention.

The first object of this invention is to provide a cryogenic power cable comprising a conductor provided with a passage for a cooling medium a semi-conductive thermal insulating material layer disposed on the conductor, and an electric insulation layer disposed on the outside of the thermal insulating material layer. With this a great improvement can be attained in the electric characteristics of cryogenic power cables, particularly, of high-voltage, so that cables of a high stress design can be obtained.

The second object of this invention is to provide a high-voltage power cable wherein a cable core comprising a conductor and an insulation layer which is formed by winding either an insulating paper or a synthetic resin film on the conductor and which is impregnated with an insulating liquid is cooled down to a temperature between −40° C and −100° C. This is based on a finding from researches conducted by the inventors for the cryogenic temperature characteristics of oil-and-insulating paper composite insulation systems. According to the finding, the effect of reduced temperature can be greatly enhanced in the insulation breakdown characteristic by lowering the temperature to a certain specific range of temperature.

The reason for cooling the cable core down to a temperature range from −40° to −100° C in accordance with this invention can be understood from the following example: A kraft paper, a spunbonded polyethylene paper which is supercalendered and a low density polyethylene film were selected as insulating materials. They were vacuum-impregnated with dodecyl benzene (DDB) and mineral oil for power cable which were employed as insulating liquids. Each of the insulating paper materials thus prepared was subjected to the tests of impulse breakdown strength and AC breakdown strength, which were measured with plate electrodes. The results of the tests are as shown in the accompanying drawing FIG. 1. As apparent from this drawing, the AC breakdown voltage at room temperature (+20° C) increased 1.2 to 2.5 times at temperatures of between −60° C and −95° C. As for the impulse breakdown voltage, the value obtained at room temperature (+20° C) also increased 1.2 to 2.5 times at temperatures between −40° C and −95° C. Particularly, with spunbonded polyethylene paper employed as insulating paper and when the tests were conducted immediately before the solidification of the dodecyl benzene at a temperature in the vicinity of −90° C, both the AC breakdown voltage and the impulse breakdown voltage showed values which were 3.0 times as high as that of conventional oil impregnated kraft paper.

As mentioned in the foregoing, great improvement can be attained in the AC breakdown voltage and impulse breakdown voltage by lowering the temperature of the cable core down to a temperature range of −40° C to −100° C. This makes it possible to reduce the thickness of the insulation layer of the cable to a great extent. When the insulation layer is formed by spunbonded polyethylene paper which is impregnated with dodecyl benzene, if the working stress is set 3 times as great as that of the conventional power transmission cables, the thickness of the insulation layer can be set at about ⅓ of that of the conventional cables, i.e. the thickness of 30 mm of the insulation layer of a 500 KV oil-filled cable of the conventional design can be reduced to 10 mm or thereabout.

While this invention imposes no particular restrictions on the ratio of the dielectric constant of the insulating liquid such as dodecyl benzene to that of the insulating paper or synthetic resin film, the use of a composite insulation system comprising a combination that have such a ratio between 0.7 and 1.2 is preferable. With the insulation layer formed by an insulating material which is within this range of combination, a cable which greatly excels in AC breakdown voltage and in impulse breakdown voltage can be obtained.

In accordance with this invention, it is not always necessary to provide a thermal insulating layer such as foamed polyethylene or foamed polyurethane round the outer circumference of the cable core. However, such arrangement is preferable as it serves to enhance the cooling effect by preventing the coldness from being dispersed to the outside.

The cooling medium to be employed in accordance with this invention is selected out of freon such as Freon-14 or Freon-22; Dry Ice methane which is prepared by mixing Dry Ice in methanol; ammonia; low temperature natural gas and the like.

The insulating liquid to be employed in accordance with this invention is selected out of dodecyl benzene, mineral oil and the like.

The third object of this invention is to provide a high-voltage power cable which is characterized in that the cable core comprises a conductor and an electric insulation layer which is formed by winding an insulating paper or a synthetic resin film round the conductor and which is impregnated with an insulating liquid, with a thermal insulating material layer arranged round the outer circumference of the electric insulation layer and the thermal insulating layer are disposed inside a cooling medium passage pipe.

The fourth object of this invention contemplates the provision of a method whereby the breakdown voltage of a power cable having the above stated cable core is increased by applying a compression gas pressure from outside to the electric insulation layer impregnated with an insulating liquid in such a manner as to prevent voids from being produced inside the insulation layer.

The fifth object of this invention is to provide a cryogenic power cable wherein a thermal insulating material layer of a desired thickness is provided between a conductor and an electric insulation layer to permit adjustment of the temperature of the electric insulation layer to a desired temperature between room temperature and −100° C and preferably between −40° C and −100° C and wherein the thermal insulating material layer is either semiconductive or arranged to have the inner and outer faces thereof electrically connected to each other. Such arrangement is necessary because thermal insulating materials are inferior in electrical insulation characteristics and yet, in this case, the thermal insulating material layer is provided directly on the conductor and is thus positioned where there is the greatest intensity of electric field. Insulation breakdown, therefore, begins in this part and advances therefrom to deteriorate the voltage resisting property of the electric insulation layer to a great extent. This problem can be solved when the thermal insulating material layer is either arranged to be semiconductive or arranged to have its inner and outer faces electrically connected to each other. For example, the outside of the conductor is formed with a material which is not only thermal insulating but also semiconductive. Such material is obtained, for example, by mixing conductive carbon grains in foamed polyethylene or foamed polyurethane. As for the electric characteristic value of the semiconductive thermal insulating material layer, the preferred volume resistivity is less than $10^6$ Ω-cm. With this value exceeded, the purpose of the semiconductive layer is hardly attainable.

When a material having a volume resistivity of above $10^6$ Ω-cm such as foamed polyethylene or polyurethane is used for the thermal insulating material layer, a metallized paper may be wound round the thermal insulating material layer and the metallic face thus arranged may be electrically connected to the conductor.

Furthermore, since the temperature of the electric insulation layer can be selected in relation to the thickness of the thermal insulating material layer in accordance with this invention, the electric insulation layer can be formed by any processes such as vacuum insulation, extrusion insulation, oil impregnating insulation, etc.

The sixth object of this invention is to provide a power cable comprising a thermal insulating material layer disposed on the outside of a conductor which has a cooling medium passage, an electric insulation layer which is disposed on the thermal insulating material layer and another thermal insulating material layer which has a lower thermal conductivity than the above stated thermal insulating material layer and which is disposed on the outside of the electric insulation layer.

In a power cable having a semi-conductive thermal insulating material layer disposed on the outside of a conductor, which is provided with a cooling medium passage, and further having a conductor shielding layer, an electric insulation layer, an insulation shielding layer, a metal sheath and an anticorrosion layer, with these layers arranged in succession toward the outside for carrying out electric insulation at room temperature or thereabout, there is a great quantity of influent heat from outside, because the electric insulation layer is provided only with a coating such as the anticorrosion layer. With such poor arrangement, the withstand voltage is greatly increased by the insulation arrangement which is impregnated with an ordinary cable insulation oil such as dodecyl benzene or mineral oil. This makes it difficult to set the insulation layer temperature in the temperature range of $-40°$ C to $-100°$ C. Hence the anticorrosion layer must be made unnecessarily thick.

In order to solve this problem, therefore, such an anticorrosion layer is replaced with a thermal insulating material layer of low thermal conductivity in the above stated cryogenic cable of this invention.

All of the power cables described in the foregoing are cryoresistive cables permitting the utilization of gas helium for an operating temperature of about $-250°$ C, liquid hydrogen for temperature about $-253°$ C, liquid nitrogen for temperature about $-196°$ C and LNG for temperature about $-161°$ C. It is quite obvious that the present invention is applicable to a super-conducting cable which should require an operating temperature of liquid helium ($-269°$ C) in order to maintain super conductivity.

In short, this invention provides a method wherein the conventionally known method of performing electric insulation under a cryogenic condition is carried out at a temperature range which is closer to room temperature. The features of this invention include:

1. While the conductor is kept in a cryogenic state for low electric resistance with a cryogenic cooling medium arranged to flow inside the conductor, the outer circumference of the conductor is shielded from heat by means of a thermal insulating material layer, which thus permits the provision of ordinary electric insulation on its outer circumference. However, in order to prevent an electric field from being applied to the thermal insulating material layer, the thermal insulating material layer should be either made to be semi-conductive or made to be equipotential with the conductor by winding a metallized paper round the surface of the layer.

2. The insulation breakdown strength of an oil impregnated paper insulation greatly increases at temperatures of $-20°$ C to $-100°$ C and particularly, according to what has been discovered by the inventors, both AC and impulse breakdown strength increase so much at $-60°$ C to $-80°$ C or thereabout that they reach values more than twice as high as those obtained at room temperature. In accordance with this invention, the thickness of the thermal insulating material layer on the cryogenic conductor and that of another thermal insulating material layer on the outer circumference of the electric insulation layer are so set that the temperature of the electric insulation layer can be set within the above stated range of temperature. This makes it possible to increase the working stress conventionally adopted for oil-filled cables (less than 15 KV/mm) up to about twice as much. As a result, the thickness of the electric insulation layer also can be reduced to obtain a cable of a smaller outside diameter. Although the outside diameter of a cryogenic cable inevitably becomes greater due to requirement for thermal shielding, the outside diameter of the cryogenic cable of the invention can be reduced, because the electric insulation can be utilized also for thermal shielding while the thickness of the electric insulation also can be reduced.

3. The large outside diameter of the conventional cryogenic cable has presented a problem also in terms of transportation because of the limited size of drums. Such problem can be solved in accordance with this invention.

4. Since at present it is deemed to be the most important subject for researches and development to provide cryogenic cables which permit the use of ordinary materials for their electric insulation, this invention makes a great contribution toward the fulfillment of such requirement.

Figure 1B:
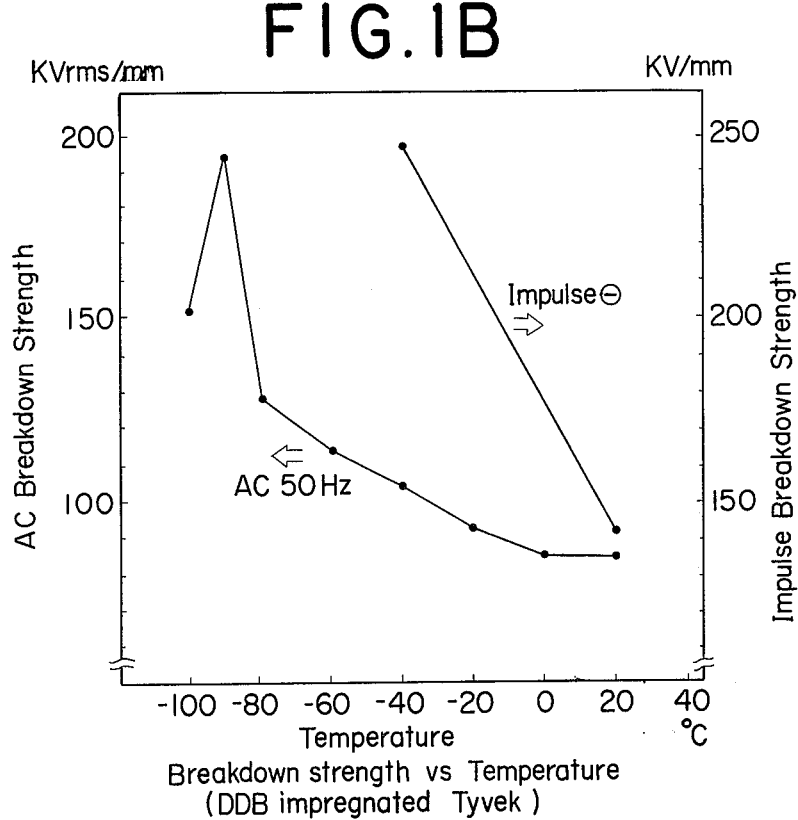
Figure 1C:
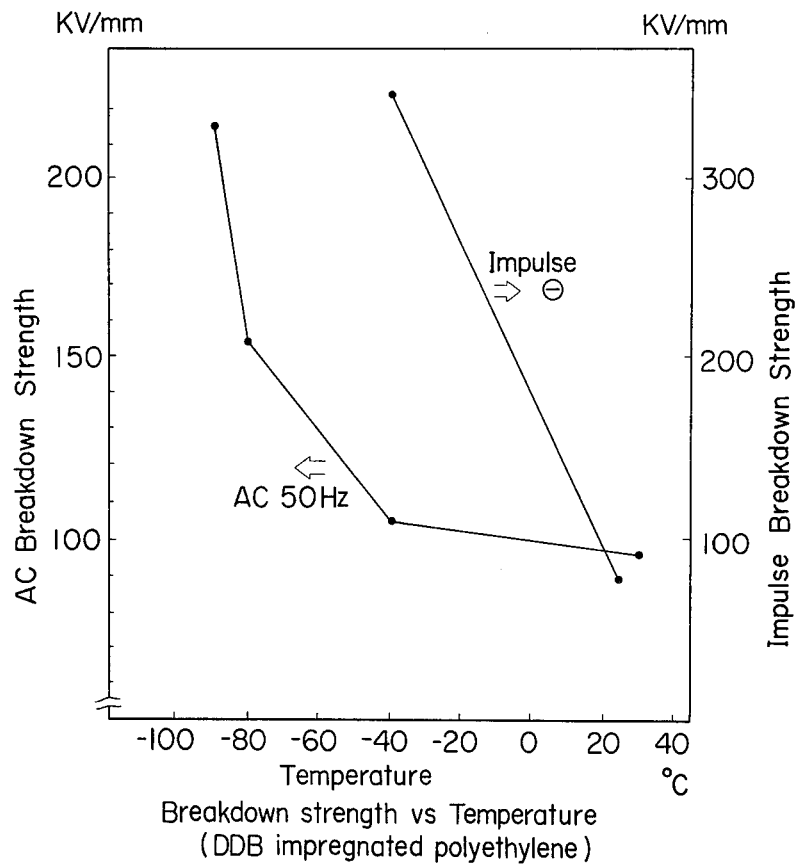
Figure 2:
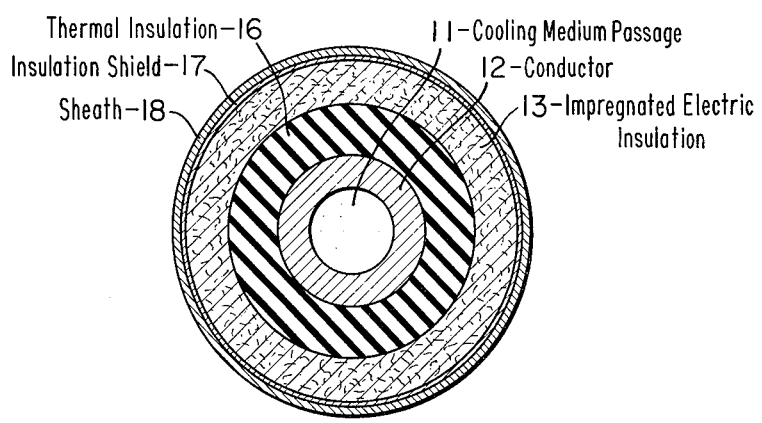
FIG. 2 is a sectional view illustrating a cryogenic power cable prepared in accordance with this invention.

Other objects and advantages will be apparent from the ensuring description and drawings in which FIG. 1 is a graph illustrating the relation of the temperature to the electric characteristics of an oil impregnated papers which are prepared by impregnating kraft paper, spunbonded polyethylene paper and low density polyethylene paper with dodecyl benzene, except that FIG. 1A includes a paper prepared by impregnating kraft paper with mineral oil instead of dodecyl benzene. FIG. 2 is a sectional view illustrating a cryogenic power cable prepared in accordance with this invention. In FIG. 2, the reference numeral 11 indicates a cooling medium passage, 12 a conductor, 13 an electric insulation layer, 16 a thermal insulating material layer, 17 a metallized paper layer and 18 a sheath pipe. FIG. 3 is a sectional view illustrating a low temperature power cable prepared in accordance with this invention. FIG. 4 illustrates the influent heat quantity entering the cable of this invention. FIG. 5 is a sectional view illustrating a conventional cryogenic power cable. FIG. 6 is a sectional view illustrating an another example of a low temperature power cable prepared in accordance with this invention. The reference numeral 101 indicates a cooling medium passage, 102 a conductor, 103 a conductor shielding layer, 104 an electric insulation layer, 105 an insulation shielding layer, 108 an inner thermal insulating material layer, 109 a metal sheath, 110 protective covering, 111 an outer thermal insulating material layer and 112 a moisture-proof sheath.

To further illustrate this invention, and not by way of limitation, the following examples are given.

EXAMPLE 1

As shown in FIG. 2, a copper conductor 12 which measures 70 mm in outer diameter and which was provided with a cooling medium passage 11 thus measuring 50 mm in inner diameter was coated with foamed polyurethane 16 which was prepared by mixing 30 parts by weight of carbon black in 100 parts by weight of crude urethane liquid before a foaming process (insulation resistance: about $10^4$ $\Omega$-cm and thermal conductivity: about $5 \times 10^{-4}$ W/cm°K), the coating thus provided measuring 5 mm in thickness. On the outside of the coating, a D.D.B. (dodecyl benzene) impregnated kraft paper 13 measuring 27.5 mm was provided. An ordinary metallized paper 17 was applied to the surface of the oil-impregnated insulation layer as an insulation shield. On the outside of this, the final external layer was formed by an aluminum corrugated pipe. In this manner, a power cable of 500 KV was obtained.

To reduce the skin effect which causes an increase in resistance to an AC current, the cable conductor of this example is preferably of a stranded structure. In order to prevent the cooling medium from leaking into the thermal insulating material layer, an airtight pipe may be formed by extrusion on the stranded conductor. Use of such airtight pipe arrangement has been attempted with good results.

The electric characteristics, etc. of the invented cable of this example were measured with the results shown in Table 1. For comparison with the cable of this example, the electric characteristics, etc. of a normal (or room) temperature power cable of the 500 KV class obtained by the conventional method (conventional cable) and those of a 500 KV class cryogenic power cable obtained by a conventional method shown in FIG. 6 (comparison cable) were also measured as shown in Table 1.

Table 1

|  | Cable of This Invention | Conventional Cable | Comparison Cable |
| --- | --- | --- | --- |
| Thickness of insulation layer, mm: | 27.5 | 30.0 | 30.0 |
| Inner face temp. of insulation layer, °C: | −100 | room temperature | −196 |
| Outer dia. of cable, mm: | 140 | 130 | 800 |
| Allowable current, A: | 6000 | 1500 | 6000 |
| AC breakdown voltage, KV: | 980 | 890 | 780 |
| Impulse breakdown voltage, KV: | 2800 | 2200 | 1800 |

As apparent from the above table, the cable of this invention permits temperature increase of the insulation layer up to room temperature in contrast with the "comparison" cable. Therefore, there will be produced no cracks or distortion in the plastic paper, such as a polyethylene paper, of the insulation layer. Also, there will be produced no gaps between one portion of the paper and another. This permits the use of ordinary electric insulations that have long been adopted for use in ordinary cables. With such a reliable insulation layer, the characteristics of a cryogenic cable can be fully obtained. Furthermore, since the outer diameter of the cable can be greatly reduced as compared with the "comparison" cable, installation work will be facilitated, because, unlike the "comparison cable," it does not require such a troublesome work as to pull the cable core into a large pipe after the pipe has been installed. Also, the manufacturing processes can be simplified because such steps as vacuum drawing, etc. are dispensable in the process of forming the insulation layer.

This invention is not limited to the above stated electric power cables, but is applicable also to other electric devices such as condensers.

EXAMPLE 2

For the purpose of comparing the performance of the cable of this invention with that of the conventional cable, a cable was prepared as illustrated in FIG. 2 (the invented cable). The diameter of the conductor was 600 sq. The insulation layer is formed to have an insulation thickness of 12.5 mm with an oil-impregnated paper prepared by impregnating kraft paper sheets (each sheet measuring 125μ in thickness) with dodecyl benzene. On the other hand, the conventional cable was made comprising a conductor measuring 600 sq, an insulation paper prepared by impregnating kraft paper with dodecyl benzene and is wound round the outer circumference of the conductor, and a metal sheath and a plastic sheath both arranged on the outside of the insulation paper. The AC breakdown voltage and the impulse breakdown voltage of the two were measured with the invented cable cooled down to a temperature of −90° C while the conventional cable was left at room temperature. The results of measurement are shown below:

|  | AC Breakdown Voltage | Impulse Breakdown Voltage |
| --- | --- | --- |
| Invented cable: | 950 KV | 1900 KV |
| Conventional cable: | 450 KV | 1000 KV |

The cable obtained in accordance with this invention greatly excels in the insulation layer in terms of AC breakdown voltage and impulse voltage. The allowable current, therefore, can be increased to a great extent. This invention is believed to be applicable also to ultra-high voltage cables of 750 KV and 1000 KV classes.

EXAMPLE 3

Referring to FIG. 3, a cooling medium passage 101 was provided in a conductor 102. An oil-impregnated insulation layer 104 was provided on the outside of the conductor 102 either through a thermal insulating material layer 108 and a shielding layer 103 or through the shielding layer 103 only. On the further outside, there were provided a similar shielding layer 105, a metal sheath 109, a thermal insulating material layer 111 and a moisture proof sheath 112 made of a metal foil or a metal foil-and-polyethylene lamination sheet.

In accordance with this invention, the anticorrosion layer in the cryogenic power cable of the prior art was replaced with a thermal insulating material layer 111 having a lower thermal conductivity than the electric insulation layer and formed by a material such as foamed polyethylene, foamed polystyrene, polyurethane, silica powder, silasballon, etc. and was preferably formed by winding a foamed polyethylene sheet. As for the reason for forming this layer 111 with a material of lower thermal conductivity than that of the electric insulation layer 104 formed with an oil-impregnated paper or the like, the thermal insulating material layer 111 is used not only for preventing exterior heat from entering the cable as much as possible but also for having a minimal temperature gradient inside the oil-impregnated insulation layer. The inner thermal insulating material layer 108 may be omitted in cases where the temperature of the cooling medium is within a range of $-100°$ C to $-40°$ C. It is desirable that the inner thermal insulating material layer is semiconductive, but such is not absolutely necessary.

With an electric current of 12000A applied while liquid nitrogen is arranged to flow inside the cooling medium passage, the cryogenic power cable of this invention and that of FIG. 6 (will be called "Reference Cable") can be expressed by generic formulas in terms of influent quantity of heat as shown below:

The Invented Cable $$Q = K_1 \frac{2\pi(T_2-T_1)}{\ln\frac{r_2}{r_1}} = K_2 \frac{2\pi(T_3-T_2)}{\ln\frac{r_4}{r_3}} = K_3 \frac{2\pi(T_4-T_3)}{\ln\frac{r_6}{r_5}}$$

Reference Cable $$Q' = K_1 \frac{2\pi(T_2'-T_1')}{\ln\frac{r_2'}{r_1'}} = K_2 \frac{2\pi(T_3'-T_2')}{\ln\frac{r_4'}{r_3'}} = K_4 \frac{2\pi(T_4-T_3)}{\ln\frac{r_6'}{r_5'}}$$

wherein,

Q and Q': Influent quantity of heat
$K_1$: Thermal conductivity of inner thermal insulating material layer
$K_2$: Thermal conductivity of oil-impregnated insulation layer
$K_3$: Thermal conductivity of outer thermal insulating material layer
$K_4$: Thermal conductivity of protective covering
$T_1$ and $T_1'$: Outer surface temperature of the conductor
$T_2$ and $T_2'$: Inner surface temp. of electric insulation layer (outer surface temp. of inner thermal insulating material layer)
$T_3$: Inner surface temp. of outer thermal insulating material layer (outer surface temp. of electric insulation layer)
$T_4$: Outer surface temp. of outer thermal insulating material layer
$T_3'$: Inner surface temp. of protective covering
$T_4'$: Outer surface temp. of protective covering
$r_1$ and $r_1'$: Outer radius of the conductor
$r_2$ and $r_2'$: Inner radius of inner thermal insulating material layer
$r_3$ and $r_3'$: Outer radius of conductor shielding layer
$r_4$ and $r_4'$: Inner radius of electric insulation layer
$r_5$: Inner radius of outer thermal insulating material layer
$r_6$: Outer radius of outer thermal insulating material layer
$r_5'$: Inner radius of protective covering
$r_6'$: Outer radius of protective covering Further, the conductor loss (P) with an electric current of 12,000 A applied can be obtained from the following formula, the conductor being made of aluminum measuring 56 mm in inner dia. and 80 mm in outer dia.:

$$P = I_2R = (1200)^2 \times (0.25/25.63) \times 10^{-6} = 1.36 \text{ w/cm} \quad (1)$$

wherein, the specific resistivity of Al is 0.25 $\mu\Omega$-cm while the sectional area of the conductor is 25.63 cm².

Referring to FIG. 4, in the cable of this invention, the temperature of the electric insulation layer 4 is approximately determined by the ratio of inner thermal resistance $R_1$ to outer thermal resistance $R_3$. With the outer and inner thermal insulating material layers arranged to be thicker, the temperature gradient of the electric insulation layer 4 can be reduced to a great extent and the quantity of influent heat into the cooling medium layer can be further lessened.

In FIG. 4, $T_1$, $T_2$, $T_3$ and $T_4$ represent what has been described in the foregoing. Further referring to FIG. 4, when the exterior temperature is 40° C and the surface temperature of the conductor $-196°$ C, there obtain the following relations between $T_1$ and $T_2$, $T_2$ and $T_3$, and $T_3$ and $T_4$ respectively:

$T_2 - T_1 = QR_1$
$T_3 - T_2 = QR_2$
$T_4 - T_3 = QR_3$

It is desirable, in this case, to adjust the temperature between $T_3$ and $T_2$ to a range of $-80°$ C to $-40°$ C.

Now, this invention will be understood in further details from the following description of an embodiment.

Referring to FIG. 3, in a cryogenic power cable with liquid nitrogen (average temperature $-193°$ C) flowing inside a cooling medium passage, a semiconductive polyurethane thermal insulating material layer of 92 mm dia., a conductor shielding layer of metallized paper of 94 mm dia., an oil-impregnated insulation layer of 110 mm dia., a corrugated pipe of 118 mm dia. and an outer polyurethane thermal insulating material layer of 138.4 mm dia. are formed respectively on the outside of an aluminum conductor measuring 56 mm in inner dia. and 80 mm in outer diameter. The cooling medium passage is arranged to be of a liquid-tight structure to prevent the cooling medium from entering the thermal insulating material layer.

The temperature of the outside of and that of the inside of the electric insulation layer are measured. The measured values are $-80°$ C and $-43°$ C respectively thus showing a temperature gradient of 37° C. Then, the influent quantity of heat Q is measured to find:

$$Q = 3 \times 10^{-4} \text{ w/cm} \frac{2\pi(193 - 80)}{\ln\frac{92}{80}} = 1.52 \text{ w/cm}$$

which indicates that the quantity of the influent heat is about equal to the conductor loss shown in the formula (1).

On the other hand, in the case of the above stated "reference cable," the protective covering of the cable must be made to have a thickness of 5 cm in order to have the temperatures of the electric insulation layer $-80°$ C and $-40°$ C with a temperature gredient of 40° C. To do this, the outside diameter of the cable must be 220 mm, which is much greater than that of the invented cable.

With the invented cryogenic power cable of this invention, the influent quantity of heat from outside is greatly lessened and the temperature distribution in the electric insulation layer can be maintained at low temperature values within the optimum range.

The provision of the thermal insulating layers permitting a great degree of reduction in the outside diameter, the cryogenic power cable of this invention is also highly advantageous in terms of transportation and installation work.

What is claimed is:

1. A cryogenic power cable comprising
   1. an electrical conductor having a cryogenic cooling medium passage therethrough,
   2. a layer of thermal insulating material surrounding the conductor, and
   3. an electric insulation layer surrounding the layer of thermal insulating material, the electric insulating layer comprising insulating paper or plastic film which has impregnated therein an insulating liquid and the electric insulating layer being cooled with a cryogenic cooling medium to a temperature in the range of from $-40°$ C to $-100°$ C.

2. The cable according to claim 1 wherein said insulating liquid is selected from the group consisting of dodecyl benzene, mineral oil and polybutene.

3. The cable according to claim 1 wherein the insulating paper is kraft paper or synthetic paper.

4. The cable according to claim 1 wherein a pressurized gas is applied to the electric insulating layer.

5. The cable according to claim 1 wherein the thermal insulating layer is semiconductive.

6. The cable according to claim 1 wherein the electric insulation layer is surrounded by a thermal insulating layer having a thermal conductivity lower than the electric insulating layer.

7. A cryogenic power cable comprising
   1. an electrical cryogenically cooled conductor,
   2. a layer of thermal insulating material surrounding the cryogenically cooled conductor, and
   3. an electric insulation layer surrounding the layer of thermal insulating material, the electric insulating layer comprising insulating paper or plastic film which has impregnated therein an insulating liquid and the electric insulating layer being cooled with a cryogenic cooling medium to a temperature in the range of from $-40°$ C to $-100°$ C.

8. The cable according to claim 7 wherein the insulating paper is kraft paper or synthetic paper.

9. The cable according to claim 7 wherein a pressurized gas is applied to the electric insulating layer.

10. The cable according to claim 7 wherein the thermal insulating layer is semiconductive.

11. The cable according to claim 7 wherein the insulating liquid is selected from the group consisting of dodecyl benzene, mineral oil and polybutene.

12. The cable according to claim 7 wherein the electric insulation layer is surrounded by a thermal insulating layer having a thermal conductivity lower than the electric insulating layer.

13. A cryogenic power cable comprising
   1. an electrical conductor having a cryogenic cooling medium passage surrounding the conductor,
   2. a layer of thermal insulating material surrounding the passage, and
   3. an electric insulation layer surrounding the layer of thermal insulating material, the electric insulating layer comprising insulating paper or plastic film which has impregnated therein an insulating liquid and the electric insulating layer being cooled with a cryogenic cooling medium to a temperature in the range of from $-40°$ C to $-100°$ C.

* * * * *

UNITED STATES PATENT AND TRADEMARK OFFICE
CERTIFICATE OF CORRECTION

PATENT NO. : 4,039,740
DATED : August 2, 1977
INVENTOR(S) : ZENSUKE IWATA

It is certified that error appears in the above-identified patent and that said Letters Patent are hereby corrected as shown below:

Col. 10, line 1: "$P = I_2R = (1200)^2 \times \ldots$" should read --$P = I^2R = (12000)^2 \times \ldots$--.

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*